United States Patent [19]
Villani

[11] Patent Number: 4,755,289
[45] Date of Patent: Jul. 5, 1988

[54] LUBRICANT FILTER FOR INTERNAL COMBUSTION ENGINES

[75] Inventor: Franco Villani, Turin, Italy

[73] Assignee: Tecnocar S.p.A., Turin, Italy

[21] Appl. No.: 930,709

[22] Filed: Nov. 13, 1986

[30] Foreign Application Priority Data

Jun. 27, 1986 [IT] Italy .................. 67515 A/86

[51] Int. Cl.⁴ .................................... B01D 35/00
[52] U.S. Cl. ........................ 210/132; 210/136;
   210/168; 210/199; 210/206; 210/501
[58] Field of Search ............. 210/105, 130, 132, 136,
   210/149, 168, 198.1, 199, 206, 209, 316, 437,
   440, 443, 501, 450; 123/196 A, 196 R

[56] References Cited

U.S. PATENT DOCUMENTS

| | | | |
|---|---|---|---|
| 4,075,097 | 2/1978 | Paul | 210/206 |
| 4,075,098 | 2/1978 | Paul et al. | 210/206 |
| 4,144,169 | 3/1979 | Grueschon | 210/206 |
| 4,265,748 | 5/1981 | Villani et al. | 210/206 |

Primary Examiner—Richard V. Fisher
Assistant Examiner—Wanda L. Millard
Attorney, Agent, or Firm—Helfgott & Karas

[57] ABSTRACT

Lubricant filter for internal combustion engines, particularly for motor vehicles, of the screwed-on type, both for full flow and bypass filtering, the latter being obtained by superimposed filter cartridges with separation of the flow of filtered lubricant. The filter comprises an incorporated reservoir for reserve additives to be admitted to the lubricant at an appropriate time to reintegrate the original additives which are degraded or exhausted after a certain period of operation. The reservoir communicates with the rest of the filter through a discharge duct, normally closed by an on-off piston valve actuatable by means of an outer control knob, and through a feed hole normally closed by a check valve. When the on-off valve is opened, with the engine idling, the check valve is opened, too, and the reservoir of the additives is brought into communication with the rest of the filter, thus causing mixing of the additives with the lubricant which is fed directly to the oil sump.

14 Claims, 5 Drawing Sheets

LUBRICANT FILTER FOR INTERNAL COMBUSTION ENGINES

BACKGROUND OF THE INVENTION

This invention relates to a lubricant filter for internal combustion engines, particularly of motor vehicles, provided with a reservoir of additives.

More particularly, the invention relates to a filter of the screwed-on type, in which the additives of the reservoir can be introduced into the flow of the lubricant when desired.

Some types of lubricant filters for internal combustion engines are known which contain mixtures of additives designed to integrate or replace the additives that are originally present in the lubricant and after a certain period of operation are normally exhausted or degraded.

The prevalent conception of these filters with regard to the introduction of additives is such as to provide a gradual and prolonged introduction of the additives into the flow of lubricant. This is achieved, for example, by impregnating or coating the filtering material with slowly soluble additives (U.S. Pat. No. 2,310,305; or by stocking the additives in a container having permeable walls exposed to the flow of the lubricant (U.S. Pat. No. 3,749,247); or by providing a solid mix of additives accommodated in the filter in direct contact with the flow of lubricant (U.S. Pat. No. 4,075,097).

A filter designed by the Applicant himself and described in U.S. Pat. No. 4,265,748 on the other hand, is based on a different principle of introduction of additives, namely on the complete and sudden introduction of the additives into the flow of the lubricant only after a certain period of operation when the original additives are supposed to be completely exhausted or degraded. This is obtained by placing the additives in a container inside the filter, provided with at least one wall that is slowly soluble in the lubricant so as to produce, when the wall has been completely dissolved, the complete and immediate introduction of the additives into the lubricant. The moment of introduction is determined in advance as a function of the life of the lubricant on the basis of the chemical nature and the physical structure of the soluble wall of the container.

Filters of this type with slow introduction of additives into the lubricant are not considered satisfactory for optimum duration and quality of modern lubricants as these lubricants, when they are brought into commerce, already contain additives in such an amount as to ensure a good performance over a long period of time so that it is neither necessary nor correct to increase the level of additives from the very beginning even if only in a gradual manner.

On the other hand, the filter disclosed in the U.S. Pat. No. 4,265,748 mentioned above, although it is based on a more correct principle of introduction of additives, does not permit to determine exactly the moment of introduction of the additives into the flow of lubricant as this moment, in addition to the characteristics of the soluble wall of the container, also depends on the operating conditions, on the state of the engine and on other factors which cannot be exactly ascertained or determined in advance.

It is an object of the present invention to eliminate or reduce the disadvantages of the above-mentioned filters by providing a lubricant filter for internal combustion engines, particularly of motor vehicles, which permits to introduce additives into the flow of lubricant in the moment desired by the user, independently of the mileage covered and of the chemical and physical characteristics of the additives and their container.

SUMMARY OF THE INVENTION

These and other objects and advantages of the invention, which will become apparent from the following description, are achieved according to the invention by a lubricant filter for internal combustion engines, particularly of motor vehicles, which comprises a bowl containing at least one filter cartridge, a cover with a plurality of eccentric inlet apertures for the lubricant to be filtered and two outlet apertures for the filtered lubricant, an axial one and another intermediate one, a sleeve which extends axially from the cover toward the bottom of the bowl, and sealing means between the outer surface of the sleeve and the filter cartridge for separating the flow of filtered lubricant and feeding it to the outlet apertures. The improvement provided by the present invention to this filter consists in that a reservoir for lubricant additives is incorporated in the bowl and communicates with the rest of the filter through a feed hole normally closed by a check valve, and through a duct normally closed by an on-off valve actuatable, if desired, to mix the additives contained in the reservoir with the lubricant flowing in the filter.

DESCRIPTION OF PREFERRED EMBODIMENTS

Figure 1:
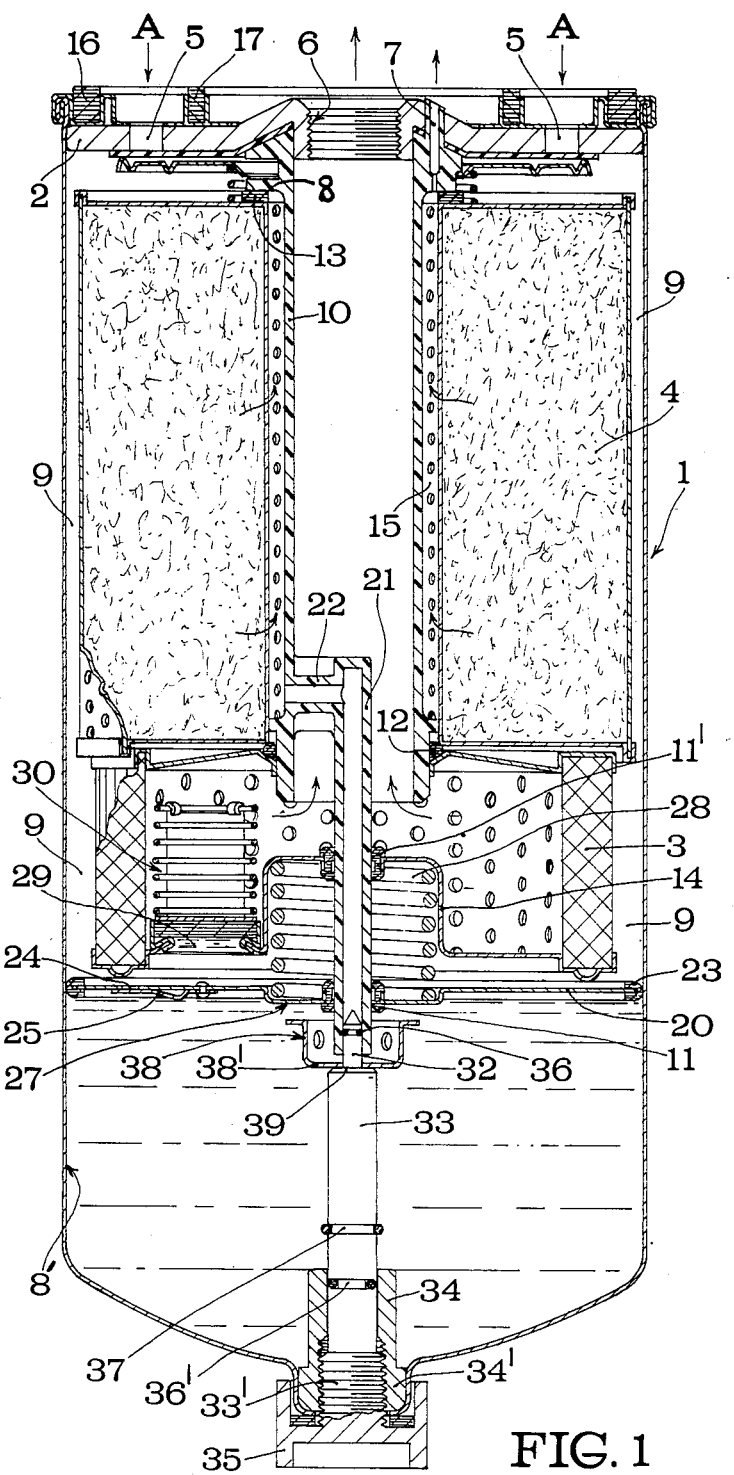
FIG. 1 is a view in axial section of a first embodiment of a filter according to the invention in the form of a filter for double or bypass filtering.

Referring to FIG. 1, a filter according to the invention shown therein is of the bypass type for double filtering and comprises a bowl 1 of deep-drawn sheet metal with a conical bottom and closed upwardly by a cover 2—made substantially as described in U.S. Pat. No. 4,265,748 of the same Applicant—and two axially superimposed filter cartridges 3 and 4, the first one for rough filtering the major portion of the flow of lubricant and the second one for fine, i.e. more intense filtering only a portion of the flow of lubricant. The lubricant enters the filter in the direction of the arrows A through a series of eccentric holes 5 from which the lubricant is admitted to an outer area 9 of the filter cartridges to then traverse them radially toward the interior. An axial sleeve 10 firmly secured to the cover extends from the latter up to the level of the rough filter cartridge 3. The upper and lower bases of both the filter cartridges are closed so that the lubricant can traverse the filter elements only in the radial direction. An annular gasket 12 is accommodated between the sleeve 10, the lower base of the upper cartridge 4 and the upper base of the lower cartridge 3 to separate the flow of the lubricant filtered in the two cartridges. In this manner the lubricant subjected to rough filtering is conducted into the interior of the sleeve 10 and then to an axial outlet hole 6 whereas the lubricant subjected to fine filtering rises in a gap 15, defined between sleeve 10, cartridge 4, gasket 12 and an upper gasket 13 placed between the lower base of cartridge 4 and a shoulder 8 of sleeve 10, and leaves the filter through an intermediate outlet hole 7. The axial hole 6, which is threaded to permit the filter to be mounted by screwing on (filter of the spin-on type), is in communication with the engine whereas the intermediate hole 7 leads to the oil sump, not shown. Accommodated in appropriate seats above the cover 2 is a pair of circular gaskets 16, 17 for sealing to the engine block and for separating the lubricant leaving the filter from the lubricant entering it.

Below the lower filter cartridge 3 for rough filtering according to the invention there is arranged a circular wall 20 which separates the lower portion of the bowl 1 from the upper portion where the filtering takes place, so as to form a reservoir 8' for a reserve of additives to the lubricant. The wall 20 is mounted, by means of a rubber ring 11 inserted in a center hole thereof, on an axial duct 21 formed integrally with the sleeve 10 into which it penetrates to a certain length and to which it is connected by an elbow 22 opening into the gap 15. A circular gasket 23 seals the outer edge of the wall 20 against the inner surface of the bowl, but nevertheless permits the wall to make small axial movements due to the oil pressure prevailing thereabove. Further, a hole 24 is provided in the wall 20, this hole being normally closed by a one-way check valve 25 which can be opened by a difference in pressure, as will be explained hereinafter.

Accommodated in a center recess 27 above the wall 20 is a spiral spring 28 adapted to keep in position both the filter cartridges in the bowl. The spiral spring 28 is upwardly received in a recess 14 of filter cartridge 3 in the center of which there is provided a hole in which a second rubber ring 11' is arranged for sealing against the duct 21.

Provided on the bottom of the lower filter cartridge is an aperture 29 which is closed by a relief valve 30, as is known in the art, to ensure the flow of the lubricant even in case of clogging of the filter.

The lower end of the duct 21 is normally closed by an on-off piston valve 32 comprising a body 33 of larger diameter, which extends to the bottom of the bowl 1 where it is received in a seat 34 the lower portion 34' of which is threaded and screwed into the cylindrical lower portion 33' of the body 33 which is likewise threaded. The lower portion 33' of the body 33 is formed integrally with a control knob 35 located outside the bowl and adapted to translate axially to unscrew the entire body 33. In this manner the piston 32 can be removed from the duct 21 and thus the reserve of additives can be brought into communication with the portion of the filter where filtering takes place, and vice versa. Appropriate gaskets 36, 36' ensure sealing of the piston 32 in the duct 21 and of the body 33 in the seat 34, respectively. A ring 37 abutting the seat 34 limits the path of movement of the body 33 during unscrewing and prevents the piston 32 from being drawn out of the duct 21.

A perforated cup 38 is fitted, by means of an axial hole made in the bottom 38', on the piston 32 and engages the abutment 39 defined between the piston 32 and the body 33 of larger diameter. This cup serves to limit the axial movement of the wall 20 produced by the pressure of the lubricating circuit acting above the wall 20.

The operation of the filter described above, as far as double or bypass filtering is concerned, is not different from the filter of U.S. Pat. No. 4,265,748. But as far as the addition of additives is concerned, the operation is as follows.

After a certain period of time, or after a certain mileage has been covered after having last changed the filter or the lubricating oil, and anyhow at the choice of the user, one proceeds to reintegration of the additives by unscrewing the control knob 35. This operation causes the piston 32 to come out of the duct 21 and brings the reservoir of the additives into communication with the gap 15 defined between the fine filter cartridge 4 and the sleeve 10. This operation is carried out with the engine idling and therefore with the lubricating oil circulating pump in operation. Under these conditions, the pressure of the lubricant, even if it is small, opens the valve 25, so that the lubricant, which normally is confined above the wall 20, can pass through the hole 24 and invade the reservoir of the additives, mixing therewith, to then flow out through the duct 21 and the elbow 22 up to the gap 15. Here the lubricant having a high concentration of fresh additives mixes with the lubricant subjected to fine filtering and leaves the filter through the intermediate hole 7 leading to the oil sump where the additives mix with a larger amount of lubricant until they rapidly reach the optimum concentration. The operation of reintegration only takes a few seconds and after that the user screws up the control knob 35 again. By the closure of the reservoir, the lubricant contained therein is excluded from the lubricating circuit the volume of which will, however, remain unchanged by the addition of the additives. It is, however, to be taken into consideration that the volume of the reservoir is negligible in comparison with the overall volume of the lubricating circuit.

Figure 2:
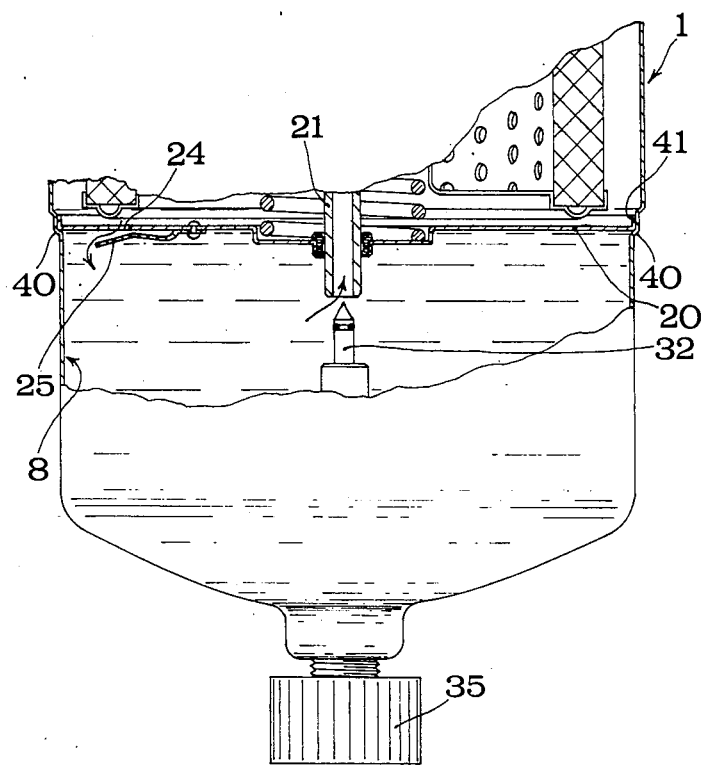
FIG. 2 is a partial view in axial section of a modified portion of the filter of FIG. 1 in a different position of operation.

FIG. 2 shows in a part sectional view a modification of the embodiment of FIG. 1. According to this modification, the wall 20 is secured to the bowl 1 by means of a deep-drawn double step 40 made therein. In this case it is no longer necessary to use any gasket on the edge of the wall which is bent upwardly in the manner of a rib 41 forced against the deep-drawn step. As the the wall 20 can no longer undergo any axial movement, the provision of the stop cup 38 on the small piston 32 is no longer required.

FIG. 2 also shows the position of opening of the duct 21, which is obtained by extracting the piston 32. This position is associated with opening of the valve 25 to permit passage of the lubricant through the hole 24. As mentioned above, the mixture of lubricant and additives flows out of the reservoir 8 through the duct 21.

Figure 3:
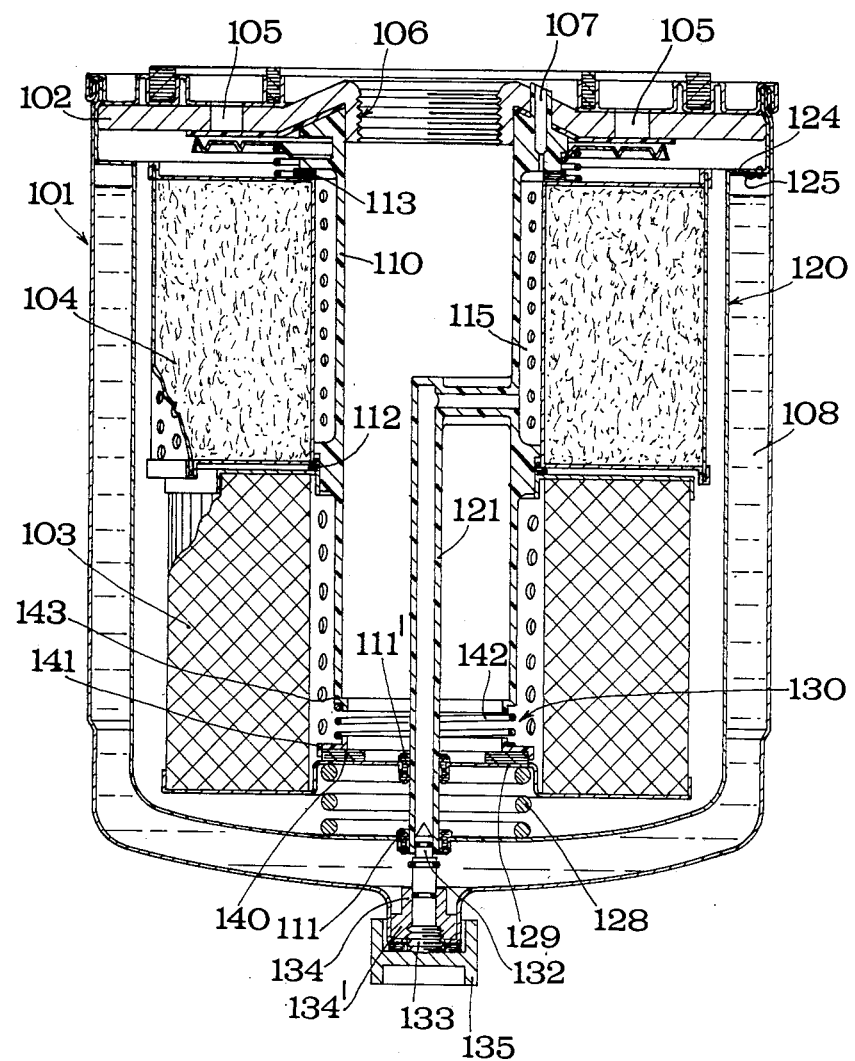
FIG. 3 is a view in axial section of a second embodiment of the filter according to the invention, again in the form of a filter for bypass filtering.

FIG. 3 illustrates a second embodiment of the filter according to the invention, again in the case of a filter with double or bypass filtering.

As far as filtering is concerned, this filter has the same structure and operation as in the embodiment shown in FIG. 1; therefore, the various component parts have been given numbers corresponding to those of FIG. 1 with the addition of 100.

The filter of FIG. 3 likewise substantially comprises a bowl 101 closed upwardly by a cover 102 and containing a rough filter cartridge 103 and a fine filter cartridge 104, the two cartridges being superimposed. In the cover there are provided inlet holes 105 for the lubricant to be filtered, an outlet hole 106 for the lubricant filtered by the cartridge 103, and an intermediate hole 107 for the lubricant filtered by the cartridge 104. An axial sleeve 110 secured upwardly between the cover and an annular gasket 113 feeds the lubricant coming from the cartridge 103 to the hole 106 and separates it by means of an annular gasket 112 inserted between the sleeve and the two cartridges 103, 104, from the lubricant coming from the cartridge 104, which is fed to the intermediate hole 107 and further to the oil sump.

According to the invention there is a second bowl 120 between the bowl 101 and the filter cartridges, with the walls of this second bowl extending parallel to those of the bowl 101 and connected and secured thereto adjacent the cover 102. Thus, the bowl 120 extends coaxially to the bowl 101, but is separated therefrom so that between the two a reservoir 108 is formed for stocking the reserve of additives. A lower spring 128 keeps the filter cartridges in position and a relief valve generally indicated by 130 ensures passage of the lubricant even in case of clogging of the filter cartridges.

The valve indicated by 130 is substantially formed by a rubber ring 140 which normally closes holes 129 provided in the bottom of the cartridge 103. The ring 140 is kept in position by a disk 141 biased by a helical spring 142 reacting against an appropriate seat 143 provided on the base of the sleeve 110.

An outflow duct 121 brings the reservoir 108 into communication with a gap 115 defined between sleeve 110 and fine filter cartridge 104. A piston valve 132 closes the lower end of duct 121 and has a lower threaded portion 133 screwed into a corresponding threaded portion 134' of a seat 134. An outer control knob 135 formed integrally with the body of the piston permits the end of the duct 121 to be opened by unscrewing, and vice versa.

Two elastic sealing rings 111 and 111' are fitted on the duct 121 and more precisely on an axial hole provided in the bottom of the inner bowl 120 and in the bottom of the lower cartridge 103, respectively. In the upper portion of the inner bowl 120, more precisely, in the section bent horizontally, a hole 124 is provided which is closed by a one-way check valve 125 having the purpose of permitting the lubricant to enter the reservoir 108 when the duct 121 is opened by the on-off piston valve 132.

As in the previous embodiment, when the duct 121 is opened, the additives contained in the reservoir 108 are admitted into the flow of the lubricant oil.

Figure 4:
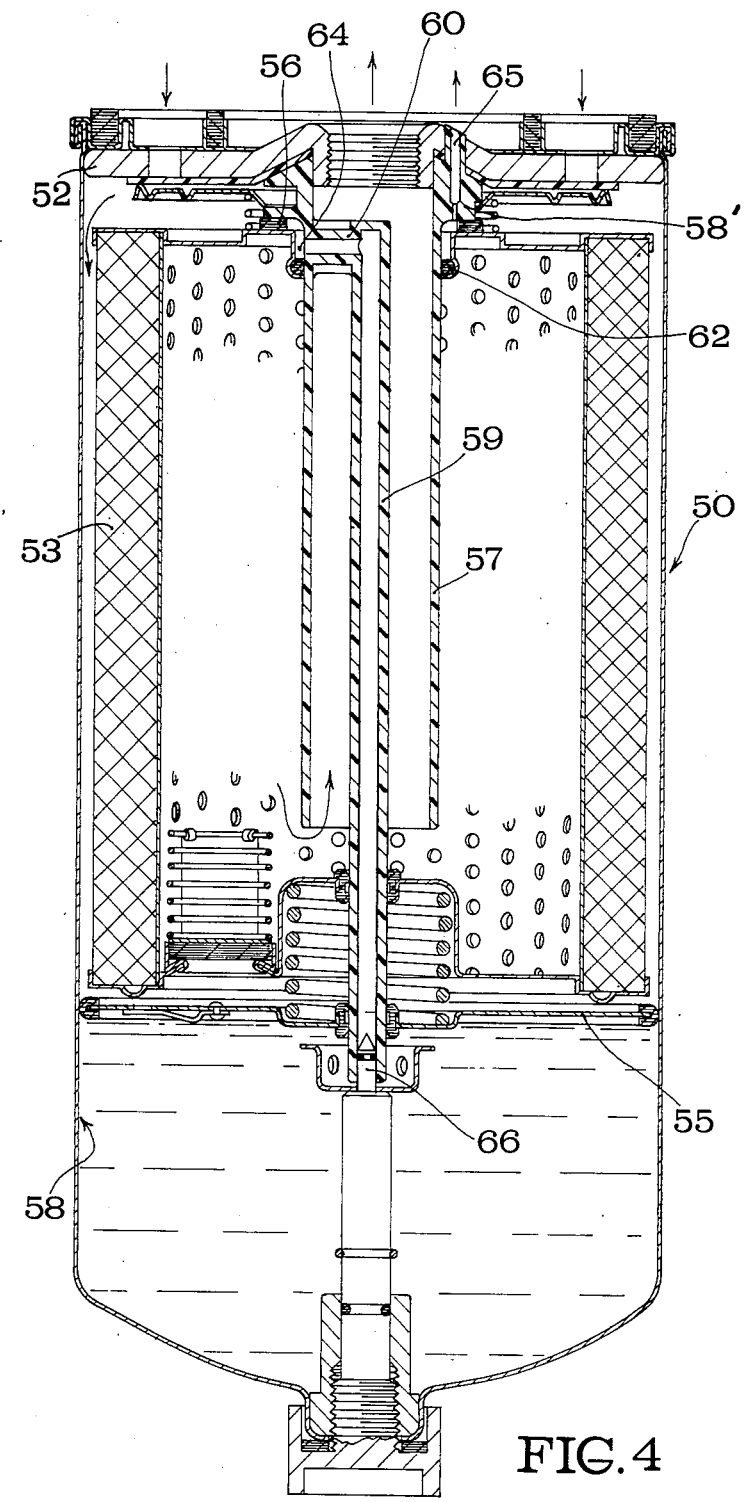
FIG. 4 is a view in axial section of a third embodiment of the filter according to the invention in the form of a filter for continuous total or full flow filtering.

FIG. 4 illustrates a different embodiment of the filter according to the invention, in the case of a filter for continuous total or full flow filtering.

The structure of the filter of FIG. 4 is substantially the same as that of the filter of FIG. 1 and comprises a bowl 50 provided with a cover 52 completely identical to the cover 2 of FIG. 1, so that we may refrain from describing it here. Accommodated in the bowl 50 is a single filter cartridge 53 by which the lubricant entering the filter is continuously filtered. Arranged below the cartridge 53 is a wall 55 which in the portion below defines a reservoir 58 for a reserve of additives, as in the case of the filter of FIG. 1. Arranged in the interior of the cartridge 53 is an axial sleeve 57 secured upwardly to the cover 52 of the bowl 50 and provided with a shoulder 58' for retaining an annular sealing gasket 56 against the upper base of the cartridge 53. The sleeve 57 is formed integrally with a duct 59 located therein and provided with an elbow 60 opening adjacent an upper portion of the cartridge 53 above an annular gasket 62 which prevents the filtered lubricant from entering the annular chamber 64 communicating with the intermediate outlet hole 65 leading to the oil sump. Downwardly the duct 59 sealingly passes through the wall 55 and is closed by an on-off piston valve 66 completely identical to that of FIG. 1, so that we may refrain from describing it here or its actuation or operation.

It will be understood that also with this type of filter mixing of the lubricant with the additives is obtained, the additives being caused to rise through the duct 59 up to the chamber 64 and being expelled therefrom through the intermediate hole 65.

Figure 5:
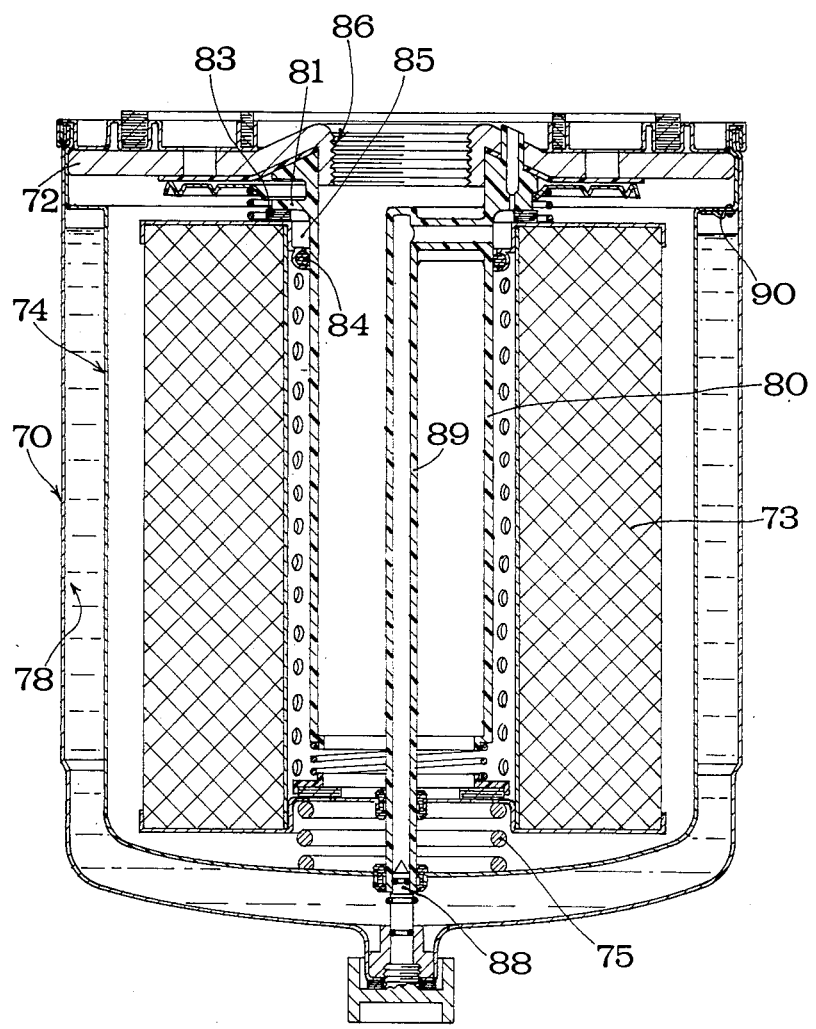
FIG. 5 is a view in axial section of a fourth embodiment of the filter according to the invention, again in the form of a filter for full flow filtering.

FIG. 5 illustrates a further embodiment of the filter according to the invention, again relating to a filter for continuous total or full flow filtering.

This embodiment is analogous to the one of the filter of FIG. 3 and substantially comprises an outer bowl 70 closed by a cover 72, as described previously, and a second bowl 74 located inwardly of and coaxially to the first one and defining a gap 78 serving as a reservoir for the additives. Accommodated within the inner bowl 74 is a single filter cartridge 73 kept in position by a helical spring 75 reacting against the bottom of the inner bowl 74. In the interior of the cartridge 74, at a certain distance therefrom, there is arranged an axial sleeve 80 which upwardly is firmly secured to the cover of the bowl and is provided with a shoulder 81 for retaining an annular gasket 83 against the upper base of the bowl 73. A second annular gasket 84 is arranged between the sleeve 80 and the inner wall of the cartridge 73 in the vicinity of the cover so as to define an annular chamber 85 closed to the flow of the filtered lubricant which leaves the filter by passing through the interior of the sleeve 80 and through the center hole 86. As in the embodiment of FIG. 3, an axial duct 89 brings the chamber 85 into communication with the reservoir 78 of the additives. Thus, mixing of the additives is obtained when the piston valve 88 is opened, followed by opening of the valve 90 due to the pressure of the lubricant in the interior of the bowl 74.

Although, some preferred embodiments of the invention have thus been described in detail and illustrated in the accompanying drawings, it is to be understood that the invention is not limited to these precise embodiments and that numerous changes and modifications obvious to one skilled in the art may be made therein without departing from the scope of the invention as defined by the appended claims.

I claim:

1. A filter for internal combustion engines, comprising a bowl having a convex bottom wall and an upper open end and containing filter cartridge means for filtering a lubricant, a cover for closing said upper open end of said bowl, said cover having a plurality of eccentric inlet apertures for lubricant to be filtered and being formed with a pair of outlet apertures for filtered lubricant, one centrally formed in said cover and another radially outwardly of said one aperture, a sleeve extending axially from said cover toward said bottom wall of said bowl, sealing means between an outer surface of said sleeve and said filter cartridge means for insulating the flow of filtered lubricant and feeding it to said outlet apertures, a reservoir for lubricant additives within said bowl but externally of the confines of said sleeve and communicating with said filter cartridge means through a feed opening operably closed by a check valve, and through a discharge duct solely for additives, operably closed by an on-off valve actuable to mix said additives in said reservoir with filtered lubricant, and to this end said discharge duct for said additives being operatively connected between said resevoir and said filter cartridge means for supply by said discharge duct of additives in said reservoir to said filter cartridge means for mixture of said additives with filtered lubricant on opening said on-off valve.

2. A lubricant filter for internal combustion engines as claimed in claim 1, wherein said reservoir for lubricant additives is defined between said bottom wall of said bowl and a circular wall arranged transversely within said bowl below said filter cartridge means, said circular wall being provided with a center hole for sealingly mounting it on said duct for discharging the additives, and with an intermediate feed hole normally closed by said check valve.

3. A lubricant filter for internal combustion engines as claimed in claim 2, wherein said circular wall is provided with an annular gasket fitted on a peripheral edge thereof for sealing against an inner wall of said bowl.

4. A lubricant filter for internal combustion engines as claimed in claim 2, wherein said circular wall is sealingly secured to the wall of said bowl adjacent a deep-drawn double step in said bowl.

5. A lubricant filter for internal combustion engines as claimed in claim 1, wherein said reservoir for said additives is defined between the inner wall of said bowl and an outer wall of a second bowl extending coaxially and inwardly of the first one, said second bowl being connected and secured to said first bowl and provided with an axial hole on the bottom thereof, for accommodating an additive discharge duct and with a lubricant feed hole normally closed by said check valve.

6. A lubricant filter for internal combustion engines as claimed in claim 1, wherein said on-off valve of said discharge duct is formed by a piston arranged axially in said reservoir for said additives and actuatable from the outside of said filter.

7. A lubricant filter for internal combustion engines as claimed in claim 6, wherein said piston has a threaded base inserted in a likewise threaded guide member accommodated on said bottom wall of said bowl, said piston extending beyond said bowl and being connected to a control knob for actuation of said on-off valve.

8. A lubricant filter for internal combustion engines as claimed in claim 6, wherein a cup is mounted on said piston for limiting the axial movement of a circular wall arranged transversely within said bowl below said filter cartridge.

9. The lubricant filter of claim 1 wherein said filter cartridge means comprises a rough filter cartridge and a fine filter cartridge arranged one above the other, said sealing means being provided between an outer surface of said sleeve and said rough and fine filter cartridges to separate the flow of filtered lubricant coming therefrom.

10. A lubricant filter for internal combustion engines as claimed in claim 9, wherein said reservoir for the additives is defined on said bottom wall of said bowl by a transverse wall arranged within said bowl below said rough filter cartridge and provided with a feed hole normally closed by a check valve, and with a center hole for accommodating said discharge duct, said on-off valve being formed by a piston having a base screwed into a bush mounted on said bottom wall of said bowl, said piston being actuatable by an outer control knob.

11. A lubricant filter for internal combustion engines as claimed in claim 9, wherein said reservoir for said additives is defined between said bowl and a further coaxial inner bowl having a walls extending substantially parallel to the walls of said first mentioned bowl.

12. In a lubricant filter for internal combustion engines, comprising a bowl having a convex bottom wall and an upper open end and containing at least one filter cartridge, a cover for closing said upper open end of said bowl, said cover having a plurality of eccentric inlet apertures for the lubricant to be filtered and a pair of outlet apertures for filter lubricant, one centrally formed in said cover and another radially outwardly of said aperture, a sleeve extending axially from said cover toward said bottom wall of said bowl, sealing means between an outer surface of said sleeve and said filter cartridge for insulating the flow of filtered lubricant and feeding it to said outlet apertures, the improvement comprising a reservoir for lubricant additives, incorporated in said bowl and communicating with said filter cartridge through a feed hole operably closed by a check valve, and through a discharge duct operably closed by an on-off valve actuable to mix closing off said discharge duct, said on-off valve being operably to mix said additives in said reservoir with filter lubricant, said reservoir being defined between said bottom wall of said bowl and a circular wall arranged transversely within said bowl below said filter cartridge, said circular wall being provided with a center hole for sealingly mounting it on said duct for discharging the additives, and with an intermediate feed hole normally closed by said check valve.

13. A lubricant filter for internal combustion engines, comprising a bowl defining a filter cartridge means containing section and a lubricant additive section defining a reservoir for lubricant additives, said lubricant additive section terminating in a convex bottom wall which defines the bottom of said bowl, said bowl having an open upper end and containing filter cartridge means for filtering lubricant, a cover for closing said upper open end of said bowl, said cover having a plurality of eccentric inlet apertures for a lubricant to be filtered and being formed with a pair of outlet apertures for filtered lubricant, one centrally formed in said cover and another radially outwardly of said one aperture, a sleeve extending axially from said cover through at least a central portion of said filter cartridge means toward said bottom wall short of said reservoir, sealing means between an outer surface of said sleeve and said filter cartridge means for insulating the flow filtered lubricant and feeding it to said outlet apertures, said reservoir communicating through a feed opening with said filter cartridge means, check valve means for normally closing said feed opening, a discharge duct operatively connected between said reservoir and said filter cartridge means for communication therebetween, and an off-off valve operatively related to said discharge duct for closing off or opening said duct to prevent or permit flow of additive into said duct for mixture with filtered lubricant in said filter cartridge means.

14. A lubricant filter for internal combustion engines, comprising a bowl having a convex bottom wall defining at least in part a reservoir for lubricant additives, said bowl having an upper open end and containing filter cartridge means for filtering a lubricant, a cover for closing said upper open end of said bowl, said cover having a plurality of eccentric inlet apertures for the lubricant to be filtered and a pair of outlet apertures for filtered lubricant, one centrally formed in said cover and another radially outwardly of said one aperture, a sleeve extending axially from said cover at least in part through said filter cartridge means toward said bottom wall short of said reservoir, sealing means between an outer surface of said sleeve and said filter cartridge for insulating the flow of filtered lubricant and feeding it to said outlet apertures, said reservoir communicating with said filter cartridge means through a feed opening, check valve means for normally closing said feed opening, a discharge duct operatively connected between said reservoir and said filter cartridge means for communication therebetween, and an actuable on-off valve operatively related to said discharge duct for closing off or opening said duct to prevent or permit flow of additives into said duct for admixture with filtered lubricant from said filter cartridge means.

* * * * *